April 18, 1933.  H. D. PRATT  1,904,081
AUXILIARY WHEEL FOR AUTOMOBILES
Filed Feb. 17, 1931  2 Sheets-Sheet 1
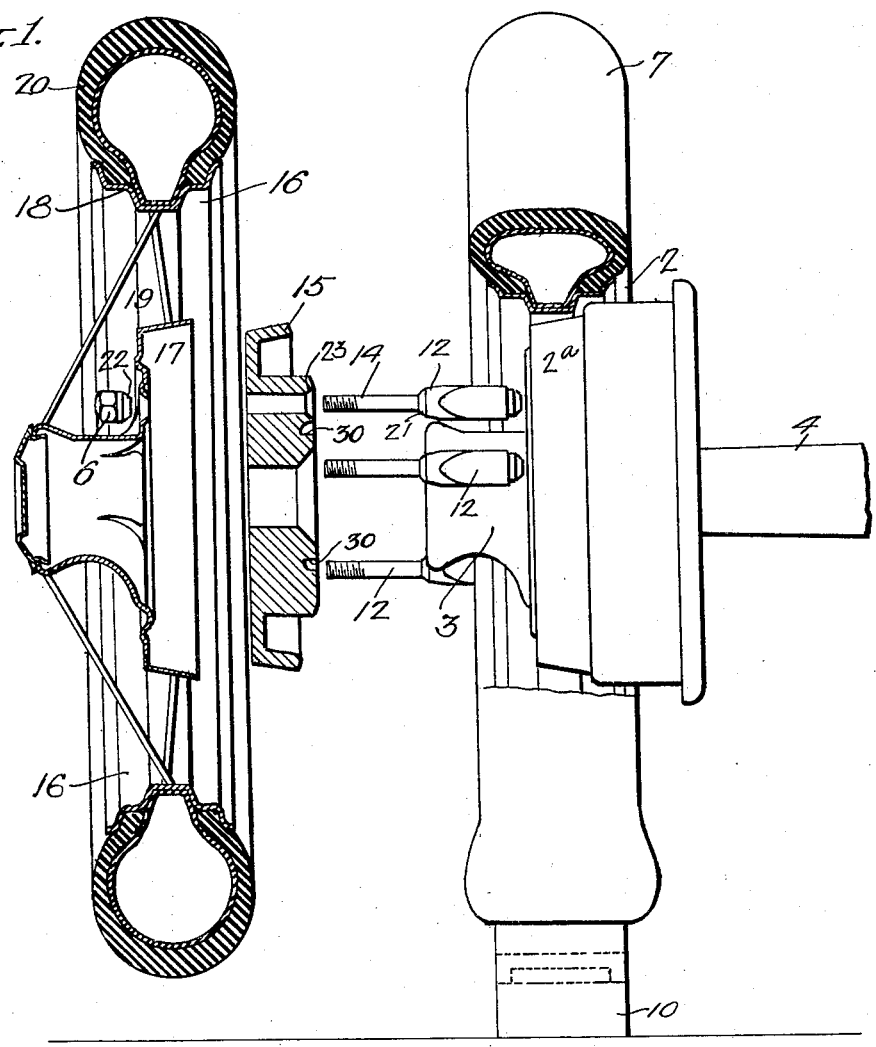
Inventor
Howell D. Pratt
by his Attorneys
Howson & Howson April 18, 1933.  H. D. PRATT  1,904,081
AUXILIARY WHEEL FOR AUTOMOBILES
Filed Feb. 17, 1931  2 Sheets-Sheet 2
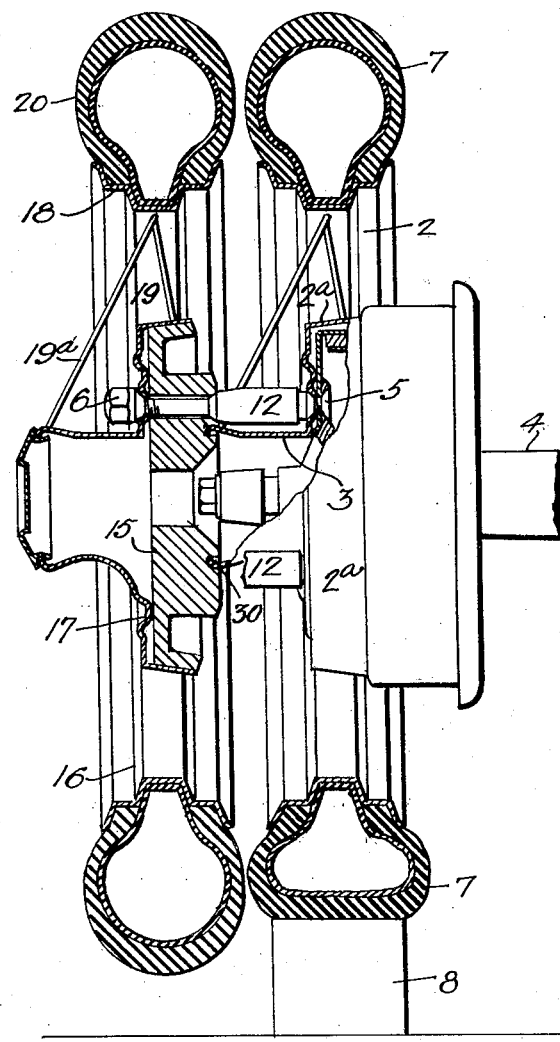
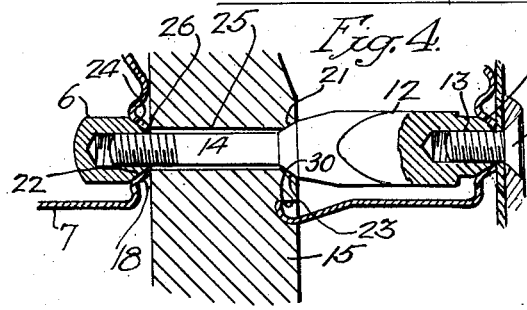
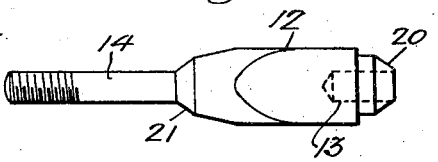
Inventor:
Howell D. Pratt
by his Attorneys
Howson & Howson Patented Apr. 18, 1933

1,904,081

UNITED STATES PATENT OFFICE

HOWELL D. PRATT, OF CHESTNUT HILL, PENNSYLVANIA

AUXILIARY WHEEL FOR AUTOMOBILES

Application filed February 17, 1931. Serial No. 516,409.

The object of my invention is to provide means for allowing an automobile to proceed after a tire has been deflated, by applying to the wheel having the deflated tire, a supplemental wheel having an inflated tire, so that the automobile can be driven under its own power either to a repair station or to its destination, without loss of time and without the necessity of calling a repair wagon which would haul the machine to the nearest repair station, or repairing the deflated tire on the spot.

Automobile wheels as now made are very heavy and to remove a deflated tire from a wheel and replace it by another, or to repair the tire and then replace it on the wheel again, is rather a difficult undertaking, and even removing the wheel having the deflated tire and replacing it by another wheel which is taken from the tire rack is an operation that requires considerable strength, and is objectionable, particularly due to the fact that the clothing and the hands are soiled during the operation and much time is lost.

In the accompanying drawings:

Fig. 1 is a sectional view, showing an automobile wheel with the deflated tire partly in section and mounted on a block, and the auxiliary hub and auxiliary wheel in section and in position to be secured to the wheel with the deflated tire;

Fig. 2 is a view showing the parts assembled, so that when the wheel is backed off of the block, the auxiliary tire will take the load;

Fig. 3 is an enlarged view of one of the extension bolts used to couple the auxiliary wheel to the main wheel; and Fig. 4 is an enlarged sectional view showing one of the bolts, a part of the hub of the main wheel, and a part of the auxiliary hub and auxiliary wheel.

Referring to the drawings:

2 is an automobile wheel having an inflatable tire 7. The hub 2a of the wheel has an extended central portion 3. The hub 2a is mounted on the brake drum hub, which is on the axle 4 of the automobile. The hub 2a is secured to the brake drum hub by bolts 5, the threaded ends of which extend beyond the hub 2a, and when nuts 6 are applied to these extended portions of the bolts they secure the hub of the wheel firmly to the brake drum hub. This is a standard type of means for securing certain detachable automobile wheels to their hubs.

The tire 7, shown in the drawings, Fig. 1, has been accidentally deflated. The usual method is to raise the automobile by a jack a sufficient distance, so that the tire will clear the ground. This is a rather laborious job and a person is apt to soil his clothes in operating the jack. The nuts on the bolts are then removed and the wheel bodily lifted off of the hub which is on the axle. Then if a spare tire is carried, it has to be detached from its carrier and then lifted bodily off the carrier and then lifted again to locate it in proper position to apply it to the hub. This is rather a strenuous operation, after which the nuts are applied to the bolts. If a spare tire is not carried, then the deflated tire has to be removed from the wheel, and after the tire has been repaired, it is replaced upon the rim of the wheel, after which the tire is inflated by an ordinary air pump. By my invention this tedious and laborious operation is entirely dispensed with, as my improved auxiliary wheel is made comparatively light, as it simply is used for a very short time and need not have the strength of an ordinary wheel.

8 is a block which may be carried by the automobile. After a tire has been accidently deflated, the block can be placed in position in line with the wheel having the deflated tire, and then by moving the car, the deflated tire will roll upon the block, elevating the wheel sufficiently that the auxiliary wheel 16 can be readily placed in position, after which the power is again applied and the traction is taken by the auxiliary wheel so that the car can be driven either to its destination or to a repair station, where the necessary repairs can be made by first removing the auxiliary wheel.

The construction of my improved auxiliary wheel and the means of applying it to the wheel of the automobile are as follows, referring to Figs. 1 to 4 inclusive.

The auxiliary wheel 16 is preferably made as light as possible with the factor of safety in mind, and has a hub 17 connected to the rim 18 by wire spokes 19—19a, one set of spokes extending to the enlarged portion of the hub and the other spokes extending to the outer end of the reduced portion of the hub. 15 is a hub-disc which fits in the hub 17 of the wheel, as shown in Fig. 2, and may be made of any light material, and may be made hollow as shown in Figs. 1 and 2. Mounted on the rim 18 is an inflatable tire 20 of the usual type. 12 is a series of extension bolts, preferably made as shown in Fig. 3, each bolt having a reduced threaded portion 14, and each end of the enlarged portion of the bolt being beveled at 20 and 21, as clearly shown in Fig. 3. In the end of the extension bolt opposite the reduced portion is a threaded opening 13. The threads of this opening are of the same pitch as the threads of the screws 5, and the threads on the reduced portion 14 of the bolt are of the same pitch as the threaded bolts 5, so that the nuts 6 can be applied thereto. It will be noticed that the nuts 6 have beveled portions 22 adapted to the hub of the main wheel, and the beveled portion 20 of extension bolt is correspondingly beveled to also fit this portion of the main wheel when the extension bolts are secured in position as shown in Fig. 4. The beveled portions 21 of the extension bolts fit the countersunk recesses 23 in the hub disc 15, and the beveled portions of the nuts 6 fit the beveled portions 24 in the hub 17 of the auxiliary wheel, so that when the extension bolts are applied, they hold the main wheel rigidly to its hub, and when the nuts are applied they hold the auxiliary wheel and its hub disc firmly in position on the extended portion 3 of the hub of the main wheel, the reduced portions of the extension bolts passing through holes 25 in the hub 15, and through similar holes 26 in the hub 17. When the main wheel is deflated and rolled upon the block 8, then the nuts 6 are removed and the extension bolts are screwed onto the projecting portions of the bolts 5, and when all the extension bolts are in position, the hub disc 15 is positioned on the extension 3 of the hub of the main wheel, after the cap has been removed, the outer end of the extension of the hub entering an annular recess 30 in the hub disc, the extension bolts passing through the holes 25. Then the auxiliary wheel is placed in position, the bolts extending through the holes 26 in the hub of this wheel, the wheel being centered by the hub 15. Then the nuts 6 are applied to the projecting threaded portions of the extension bolts, so as to draw the auxiliary wheel tightly in position. When the wheel is in position, as shown in Fig. 2, the deflated wheel is rolled off of the block 8 by the power of the automobile, the auxiliary wheel with its inflated tire 20 carrying the load. The deflated tire of the main wheel will not be injured as it is free to turn without crushing.

It will be noticed that the extension bolts can be very cheaply manufactured as comparatively little machining insures a tight fit of the parts. The auxiliary bolts 12 are of such a length that there will be sufficient space between the tires of the two wheels as to allow a chain to be placed on either wheel if necessary, and while I have shown particular forms of wire wheels, it will be understood that other types of wheels may be used without departing from the essential features of the invention.

The auxiliary wheel is preferably of the same design as the main wheels of the automobile, only it may be made of comparatively light material, so that it can be readily handled.

I claim:—

1. The combination in an automobile, of a main wheel having a hub with beveled apertures and securing bolts passing through said apertures, the threaded portions of the bolts extending beyond the body of the hub of the wheel, said hub having an extended central portion; an auxiliary wheel arranged to be secured to the main wheel, said auxiliary wheel having a hub with a central extended portion, the main portion of the hub being perforated in line with the bolts of the hub of the main wheel, the hub having an inturned flange forming a recess; a hub disc located in the recess of the hub of the auxiliary wheel and having holes with beveled inner ends aligned with the bolts of the main wheel, supplemental bolts having internal screw threads adapted to the projecting portions of the bolts of the main wheel, the inner ends of the supplemental bolts being beveled to fit said beveled apertures in the hub of the main wheel, the supplemental bolts being reduced in diameter where they extend through the hub disc and hub of the supplemental wheel and the reduced ends being threaded, the enlarged portions of the supplemental bolts being beveled to fit the beveled inner ends of the holes in the hub disc; and nuts secured to the threaded reduced portions of the supplemental bolts, arranged to draw the hub disc firmly against the extension of the hub of the main wheel.

2. The combination in an automobile, of a main wheel having a hub with a central extension; a series of holes in the main portion of the hub; bolts projecting from the main portion of the hub; a hub disc having an annular recess to receive the outer end of the projecting portion of the hub of the main wheel and having a series of holes, the inner ends of the holes being beveled; a supplemental wheel having a recessed hub in which the hub disc is mounted, the said recessed hub having holes in alignment with the holes of the said hub disc; a series of supplemental bolts having enlarged inner end portions, the inner ends of the bolts having internal threads adapted to the projecting bolts of the main hub, the said bolts being reduced in diameter at their outer ends and extending through the hub disc and hub of the supplemental wheel, the enlarged portions of the supplemental bolts being beveled at their outer ends to fit the beveled portions of the holes in the hub disc; and nuts mounted on the reduced portions of the bolts for securely clamping the supplemental wheel and its hub disc against the projecting portions of the hub of the main wheel.

3. The combination in an automobile, of a main wheel having a hub with an extended central portion; a supplemental wheel having a recessed hub; a hub disc mounted in the recess and having an annular groove for receiving the extension of the hub of the main wheel; bolts having their threaded portions projecting from the hub of the main wheel and supplemental bolts screwed onto the projecting portions of the bolts in the main hub and extending through the hub disc and hub of the supplemental wheel; and nuts mounted on the said supplemental bolts for drawing the supplemental wheel and its hub disc firmly against the projecting portions of the hub of the main wheel.

HOWELL D. PRATT.